A. C. S. ANGEL.
PROSTHESIS.
APPLICATION FILED SEPT. 18, 1917.

1,331,974.

Patented Feb. 24, 1920.

Inventor:
Asmus C. S. Angel
By
Rosenbaum Stockbridge & Borst
Attorneys.

UNITED STATES PATENT OFFICE.

ASMUS CHRISTENSEN SCHAU ANGEL, OF COPENHAGEN, DENMARK.

PROSTHESIS.

1,331,974.

Specification of Letters Patent.

Patented Feb. 24, 1920.

Application filed September 18, 1917. Serial No. 192,007.

*To all whom it may concern:*

Be it known that I, ASMUS CHRISTENSEN SCHAU ANGEL, a subject of the King of Denmark, residing at Skoubogade 1, Copenhagen, Denmark, have invented new and useful Improvements in Prosthesis; and I do hereby declare the following to be a full, clear, and exact description of the same.

The invention relates to improvements in dental bases adapted to be retained in their place by suction. The invention specially relates to improvements in plates for artificial teeth fixed on a dental plate having cavities adapted to be closed by the gum and form a space from which the air is exhausted by suction and thus form a vacuum cup. In order to prevent the gum from being sucked down into this cavity and eventually fill the same, a supporting body consisting of a helically wound spring or a porous body, for instance consisting of porous metal, rubber sponge or the like which prevents the gum from being sucked into the cavity and does not interfere with the action of the vacuum is placed therein. The vacuum can be created by exhausting the air through a valve in any convenient manner. The production of the vacuum and the means employed do not however form part of the invention.

Figure 1:
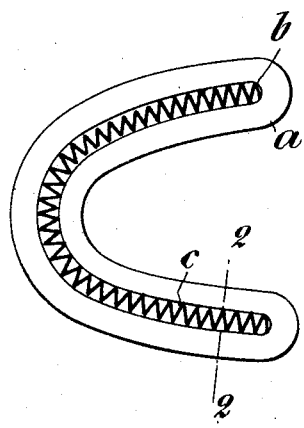
Figure 2:
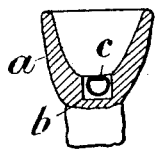
Figure 3:
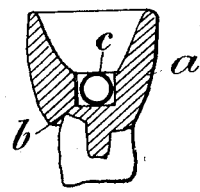

In the annexed drawing Figure 1 shows by way of example a top view of a dental plate according to the invention, and Fig. 2 a sectional view on the line 2—2 of Fig. 1, and Fig. 3 a similar view of a modification.

The body of a dental plate $a$ is provided with a cavity $b$ adapted to be covered and closed by the gum. According to the invention a helically wound wire spring $c$ made of gold or other metal is accommodated in the said cavity and prevents the gum from being sucked down and eventually filling it. Instead of the wire spring a porous body such as any spongy metal, rubber or the like may be substituted for said helical spring.

In some cases it may be desirable to use a spring of other shape than the circular, for instance that shown in Fig. 3.

Having thus fully described my invention, I claim as new and desire to secure by Letters Patent in U. S. A.:

A dental plate comprising a body portion having a cavity adapted to form with the gums a vacuum cup and a coiled spring in said cavity to prevent the gums from filling it.

In testimony whereof I have affixed my signature in presence of two witnesses.

ASMUS CHRISTENSEN SCHAU ANGEL.

Witnesses:
 CECIL V. SCHAU,
 VIGGO BLOM.